US011117480B2

(12) United States Patent
Yumoto et al.

(10) Patent No.: US 11,117,480 B2
(45) Date of Patent: Sep. 14, 2021

(54) VEHICLE AND STICKING DIAGNOSIS METHOD

(71) Applicant: Toyota Jidosha Kabushiki Kaisha, Toyota (JP)

(72) Inventors: Shingo Yumoto, Nisshin (JP); Koichi Kojima, Toyota (JP); Yamato Niwa, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 45 days.

(21) Appl. No.: 16/781,199

(22) Filed: Feb. 4, 2020

(65) Prior Publication Data

US 2020/0247255 A1    Aug. 6, 2020

(30) Foreign Application Priority Data

Feb. 6, 2019    (JP) .............................. JP2019-019967

(51) Int. Cl.
*B60L 53/16*    (2019.01)
*B60L 53/18*    (2019.01)

(52) U.S. Cl.
CPC ............... *B60L 53/16* (2019.02); *B60L 53/18* (2019.02)

(58) Field of Classification Search
CPC .................................. B60L 53/16; B60L 53/18
USPC ........................................................ 320/109
See application file for complete search history.

(56) References Cited

U.S. PATENT DOCUMENTS

| | | | | |
|---|---|---|---|---|
| 10,516,189 B2 * | 12/2019 | Loftus | ................... | H01M 10/48 |
| 10,962,583 B2 * | 3/2021 | Lehnhardt | ............ | H02H 7/1213 |
| 2011/0121780 A1 * | 5/2011 | Fukuo | ..................... | B60L 53/14 |
| | | | | 320/109 |
| 2011/0279082 A1 * | 11/2011 | Hagenmaier, Jr. | ...... | B60L 53/62 |
| | | | | 320/109 |
| 2013/0106423 A1 * | 5/2013 | Moon | ................... | B60L 3/0023 |
| | | | | 324/418 |
| 2014/0333311 A1 * | 11/2014 | Liu | ..................... | G01R 19/0038 |
| | | | | 324/418 |
| 2015/0115966 A1 * | 4/2015 | Berman | .................. | B60L 53/16 |
| | | | | 324/418 |
| 2016/0236633 A1 * | 8/2016 | Mori | ....................... | B60L 1/006 |
| 2016/0243954 A1 * | 8/2016 | Moro | ...................... | B60L 58/22 |

(Continued)

FOREIGN PATENT DOCUMENTS

| | | | | |
|---|---|---|---|---|
| FR | 3092434 | * | 2/2019 | ............. B60L 53/66 |
| JP | 2016-119762 A | | 6/2016 | |
| JP | 2018-038138 A | | 3/2018 | |

*Primary Examiner* — Suresh Memula

(74) *Attorney, Agent, or Firm* — Dinsmore & Shohl LLP

(57) ABSTRACT

When DC charging is completed, an ECU of a vehicle performs first diagnosis processing for diagnosing whether or not charge relays have stuck with an SMR being closed. In the first diagnosis processing, whether or not the charge relays have stuck is diagnosed based on an open/close command to the charge relays and a voltage applied to a charge port. When both of the charge relays are determined as having stuck in the first diagnosis processing, the ECU performs second diagnosis processing on the assumption that a DC power feed facility falls under a specific DC power feed facility. In the second diagnosis processing, whether or not the charge relays have stuck is diagnosed based on the open/close command to the charge relays, the voltage applied to the charge port (a first voltage), and a voltage (a second voltage) between a first power line and a second power line.

7 Claims, 9 Drawing Sheets

(56) References Cited

U.S. PATENT DOCUMENTS

| | | | |
|---|---|---|---|
| 2017/0015200 A1* | 1/2017 | Hatanaka | B60L 53/16 |
| 2017/0267102 A1* | 9/2017 | Hori | B60W 20/50 |
| 2018/0294660 A1* | 10/2018 | Byun | B60L 3/0046 |
| 2019/0128943 A1* | 5/2019 | Kawamura | G01R 31/52 |
| 2019/0225109 A1* | 7/2019 | Ono | B60L 3/0092 |
| 2019/0229541 A1* | 7/2019 | Ono | B60L 58/19 |
| 2020/0134944 A1* | 4/2020 | Yumoto | B60L 3/04 |
| 2020/0185175 A1* | 6/2020 | Nakayama | H01H 47/005 |
| 2020/0247242 A1* | 8/2020 | Kojima | B60L 50/51 |
| 2020/0247256 A1* | 8/2020 | Niwa | B60L 53/16 |
| 2020/0276908 A1* | 9/2020 | Lim | H02J 7/00032 |
| 2020/0313581 A1* | 10/2020 | Chon | H02M 1/32 |
| 2021/0053454 A1* | 2/2021 | Morich | B60L 53/66 |

* cited by examiner

VEHICLE AND STICKING DIAGNOSIS METHOD

CROSS REFERENCE TO RELATED APPLICATIONS

This nonprovisional application claims priority to Japanese Patent Application No. 2019-019967 filed with the Japan Patent Office on Feb. 6, 2019, the entire contents of which are hereby incorporated by reference.

BACKGROUND

Field

The present disclosure relates to a vehicle in which an incorporated power storage is chargeable by receiving electric power supplied from a power feed facility outside the vehicle and a method of diagnosing sticking of a charge relay included in the vehicle.

Description of the Background Art

Japanese Patent Laying-Open No. 2018-38138 discloses a vehicle capable of direct-current (DC) charging in which an incorporated power storage is chargeable by receiving DC power supplied from a power feed facility outside the vehicle. This vehicle includes a relay electrically connected between a power storage and a power line, a charge port for connection of a connector of the power feed facility, a voltage sensor that detects a voltage applied to the charge port, a charge relay (a first charge relay and a second charge relay) electrically connected between the charge port and the power line, and a controller that diagnoses whether or not the charge relay has stuck. The power feed facility that supplies DC power is also referred to as a "DC power feed facility" below.

In this vehicle, after DC charging is completed, whether or not the charge relay has stuck is diagnosed with the relay being kept in a closed state. In diagnosis of sticking of the charge relay, the controller diagnoses whether or not sticking has occurred based on an open/close command to the charge relay and a voltage detected by the voltage sensor while it ensures a state that no electric power is being supplied from the DC power feed facility by transmitting a stop command requesting stop of output of electric power to the DC power feed facility. Specifically, in diagnosis of sticking of a charge relay, processing for diagnosing whether or not both of charge relays (the first charge relay and the second charge relay) have stuck and processing for diagnosing whether or not each of the charge relays has stuck are performed.

In the processing for diagnosing whether or not both of the charge relays have stuck, an open command is output to both of the first charge relay and the second charge relay and whether or not sticking has occurred is diagnosed based on whether or not the voltage sensor detects a voltage of the power storage. When the voltage sensor detects the voltage of the power storage, both of the first charge relay and the second charge relay are determined as having stuck in the closed state and the process ends. When the voltage sensor does not detect the voltage of the power storage, at least one of the first charge relay and the second charge relay is determined as not having stuck in the closed state.

When at least one of the first charge relay and the second charge relay is determined as not having stuck in the closed state, processing for diagnosing whether or not each of the charge relays has stuck is performed. In the processing for diagnosing whether or not each of the charge relays has stuck, an open command is output to one of the first charge relay and the second charge relay and a close command is output to the other. In this case, whether or not one charge relay has stuck is diagnosed based on whether or not the voltage sensor detects the voltage of the power storage. When the voltage sensor detects the voltage of the power storage, one charge relay is determined as having stuck in the closed state. When the voltage sensor does not detect the voltage of the power storage, one charge relay is determined as not having stuck in the closed state.

SUMMARY

For example, when a DC power feed facility in conformity with a prescribed charging standard such as the CHAdeMO (trademark) standard, the combined charging system (CCS) standard, and the GB/T standard receives an output command requesting output of electric power from a vehicle, the power feed facility supplies electric power in accordance with the output command to the vehicle. When the DC power feed facility in conformity with the prescribed charging standard receives a stop command requesting stop of output of electric power from the vehicle, the power feed facility stops supply of electric power to the vehicle in accordance with the stop command. Namely, the DC power feed facility in conformity with the prescribed charging standard can control output/stop of electric power from a vehicle side.

There is also a DC power feed facility that is not in conformity with the prescribed charging standard. Among DC power feed facilities not in conformity with the prescribed charging standard, there is a DC power feed facility (which is also referred to as a "specific DC power feed facility" below) that does not stop, even when the DC power feed facility receives a stop command from the vehicle, supply of electric power without obeying the stop command.

In diagnosis of sticking of a charge relay in the vehicle disclosed in Japanese Patent Laying-Open No. 2018-38138, when the DC power feed facility connected to the charge port of the vehicle falls under the specific DC power feed facility, a voltage may be applied to the charge port from the DC power feed facility even though the vehicle is transmitting a stop command. Then, for example, in processing for diagnosing whether or not both of charge relays have stuck, even though both of the first charge relay and the second charge relay are normally open in accordance with an open command, the voltage sensor may detect a voltage. Consequently, the controller determines that both of the first charge relay and the second charge relay have stuck in the closed state and quits sticking diagnosis processing. In spite of the charge relay not having stuck, erroneous diagnosis that the charge relay has stuck may be made. In the vehicle disclosed in Japanese Patent Laying-Open No. 2018-38138, when the DC power feed facility falls under the specific DC power feed facility, whether or not a charge relay has stuck may not appropriately be diagnosed.

The present disclosure was made to solve the problem above, and an object thereof is to appropriately diagnose whether or not a charge relay has stuck even though a DC power feed facility falls under a specific DC power feed facility.

A vehicle according to the present disclosure includes a power storage chargeable by receiving electric power supplied through a charge cable from a power feed facility outside the vehicle, a first power line and a second power line, a first relay electrically connected between a positive electrode of the power storage and the first power line, a second relay electrically connected between a negative electrode of the power storage and the second power line, a charge port to which a connector provided in the charge cable can be connected, a first charge relay electrically connected between the first power line and the charge port, a second charge relay electrically connected between the second power line and the charge port, a first voltage sensor that detects a voltage applied by the power feed facility to the charge port, a second voltage sensor that detects a voltage between the first power line and the second power line, a communication apparatus that transmits a command to the power feed facility, and a controller that performs diagnosis processing for diagnosing whether or not the first charge relay and/or the second charge relay have/has stuck with the connector and the charge port being connected to each other. The diagnosis processing includes first diagnosis processing performed with the first relay and the second relay being closed and second diagnosis processing performed with the first relay and the second relay being open. In the first diagnosis processing, the controller outputs a command to open both of the first charge relay and the second charge relay, transmits a stop command requesting stop of output of electric power to the power feed facility through the communication apparatus, and diagnoses sticking of the first charge relay and the second charge relay based on the voltage detected by the first voltage sensor. When the controller diagnoses both of the first charge relay and the second charge relay as having stuck, it performs the second diagnosis processing. In the second diagnosis processing, the controller outputs an open or close command to each of the first charge relay and the second charge relay and determines whether or not the first charge relay and/or the second charge relay have/has stuck based on a first voltage detected by the first voltage sensor and a second voltage detected by the second voltage sensor.

A sticking diagnosis method according to the present disclosure is a method of diagnosing sticking of a charge relay of a vehicle in which an incorporated power storage is chargeable by receiving electric power supplied through a charge cable from a power feed facility outside the vehicle. The vehicle includes a first power line and a second power line, a first relay electrically connected between a positive electrode of the power storage and the first power line, a second relay electrically connected between a negative electrode of the power storage and the second power line, a charge port to which a connector provided in the charge cable can be connected, a first charge relay electrically connected between the first power line and the charge port, a second charge relay electrically connected between the second power line and the charge port, a first voltage sensor that detects a voltage applied by the power feed facility to the charge port, a second voltage sensor that detects a voltage between the first power line and the second power line, and a communication apparatus that transmits a command to the power feed facility. The method includes performing diagnosis processing for diagnosing whether or not the first charge relay and/or the second charge relay have/has stuck with the connector and the charge port being connected to each other. The performing diagnosis processing includes performing first diagnosis processing with the first relay and the second relay being closed and performing second diagnosis processing with the first relay and the second relay being open. In the performing first diagnosis processing, a command to open both of the first charge relay and the second charge relay is output, a stop command requesting the power feed facility to stop output of electric power is transmitted through the communication apparatus, and sticking of the first charge relay and the second charge relay is diagnosed based on the voltage detected by the first voltage sensor. When both of the first charge relay and the second charge relay are diagnosed as having stuck in the first diagnosis processing, the second diagnosis processing is performed. In the performing second diagnosis processing, an open or close command is output to each of the first charge relay and the second charge relay and whether or not the first charge relay and/or the second charge relay have/has stuck is determined based on a first voltage detected by the first voltage sensor and a second voltage detected by the second voltage sensor.

When the power feed facility connected to the charge port of the vehicle falls under the specific DC power feed facility, electric power may unintentionally be supplied from the power feed facility to the vehicle. Therefore, a case that both of the charge relays are diagnosed as having stuck in the closed state in the first diagnosis processing may include a case of sticking of both of the charge relays as indicated in the diagnosis and a case of erroneous diagnosis due to the voltage applied by the power feed facility to the charge port.

According to the configuration and the method, when both of the charge relays are diagnosed as having stuck in the closed state in the first diagnosis processing, second diagnosis processing is performed with the first relay and the second relay being open on the assumption that the power feed facility falls under the specific DC power feed facility. Even though electric power is unintentionally supplied from the power feed facility to the vehicle, second diagnosis processing is performed as processing for appropriately diagnosing whether or not the charge relays have stuck. In the second diagnosis processing, whether or not the first charge relay and/or the second charge relay have/has stuck is determined based on an open/close command to the first charge relay and the second charge relay, a voltage (a first voltage) applied to the charge port, and a voltage (a second voltage) between the first power line and the second power line. For example, when an open command is output to both of the first charge relay and the second charge relay and when the first voltage has attained to the voltage applied by the power feed facility and the second voltage has also attained to the voltage applied by the power feed facility, both of the first charge relay and the second charge relay can be determined as having stuck in the closed state. When the first voltage has attained to the voltage applied by the power feed facility and the second voltage has not attained to the voltage applied by the power feed facility, at least one of the first charge relay and the second charge relay can be determined as not having stuck in the closed state. By using two voltages of the first voltage and the second voltage, whether or not the charge relays have stuck can appropriately be diagnosed even though the power feed facility falls under the specific DC power feed facility.

In one embodiment, the second diagnosis processing includes both-element diagnosis processing for diagnosing whether or not both of the first charge relay and the second charge relay have stuck. In the both-element diagnosis processing, the controller outputs a command to open both of the first charge relay and the second charge relay and determines whether or not the first charge relay and the second charge relay have stuck based on relation between the first voltage and a first threshold voltage and relation between the second voltage and the first threshold voltage.

In one embodiment, in the both-element diagnosis processing, when the first voltage is higher than the first threshold voltage and the second voltage is higher than the first threshold voltage, the controller determines that both of the first charge relay and the second charge relay have stuck in a closed state.

In one embodiment, in the both-element diagnosis processing, when the first voltage is higher than the first threshold voltage and the second voltage is lower than the first threshold voltage, the controller determines that at least one of the first charge relay and the second charge relay has not stuck in a closed state.

The first threshold voltage is compared, for example, with a first voltage detected by the first voltage sensor in the both-element diagnosis processing and set as a threshold value for determining whether or not a voltage is being applied by the power feed facility to the charge port. For example, when both of the charge relays are closed while electric power is being supplied from the power feed facility, the first voltage sensor and the second voltage sensor detect a voltage higher than the first threshold voltage (the voltage applied by the power feed facility to the charge port).

When at least one of the charge relays is opened while electric power is being supplied from the power feed facility, the first voltage sensor detects a voltage higher than the first threshold voltage whereas the second voltage sensor detects a voltage lower than the first threshold voltage. When an open command is output to both of the first charge relay and the second charge relay and when the first voltage is higher than the first threshold voltage and the second voltage is higher than the first threshold voltage, both of the first charge relay and the second charge relay can be determined as having stuck in the closed state. When the first voltage is higher than the first threshold voltage and the second voltage is lower than the first threshold voltage, at least one of the first charge relay and the second charge relay can be determined as not having stuck in the closed state but as being open in accordance with the open command.

In one embodiment, in the both-element diagnosis processing, when the first voltage is lower than the first threshold voltage, the controller performs again the first diagnosis processing.

When the first voltage is lower than the first threshold voltage in the second diagnosis processing, the power feed facility may have stopped supply of electric power in accordance with the stop command received from the vehicle in the first diagnosis processing during a period from end of execution of the first diagnosis processing until start of execution of the second diagnosis processing. The power feed facility may have stopped supply of electric power with a time lag behind reception of the stop command. In such a case, by performing first diagnosis processing again, diagnosis processing can be redone with supply of electric power from the power feed facility having been stopped, and whether or not the first charge relay and the second charge relay have stuck can be diagnosed.

In one embodiment, the second diagnosis processing includes one-element diagnosis processing for diagnosing whether or not one of the first charge relay and the second charge relay has stuck. In the one-element diagnosis processing, the controller outputs a command to open the one of the first charge relay and the second charge relay and to close the other of them and determines whether or not the first charge relay and the second charge relay have stuck based on relation between the first voltage and a second threshold voltage and relation between the second voltage and the second threshold voltage.

The second threshold voltage is compared, for example, with a first voltage detected by the first voltage sensor in one-element diagnosis processing and set as a threshold value for determining whether or not a voltage is being applied by the power feed facility to the charge port. When one charge relay is not open in accordance with the open command in one-element diagnosis processing, both of the charge relays have been closed and hence the first voltage sensor and the second voltage sensor detect a voltage higher than the second threshold voltage (the voltage applied by the power feed facility to the charge port). When one charge relay is opened in accordance with the open command in one-element diagnosis processing, the first voltage sensor detects a voltage higher than the second threshold voltage whereas the second voltage sensor detects a voltage lower than the second threshold voltage. With one-element diagnosis processing, whether or not each of the first charge relay and the second charge relay has stuck in the closed state can appropriately be determined.

The foregoing and other objects, features, aspects and advantages of the present disclosure will become more apparent from the following detailed description of the present disclosure when taken in conjunction with the accompanying drawings.

DETAILED DESCRIPTION

Figure 1:
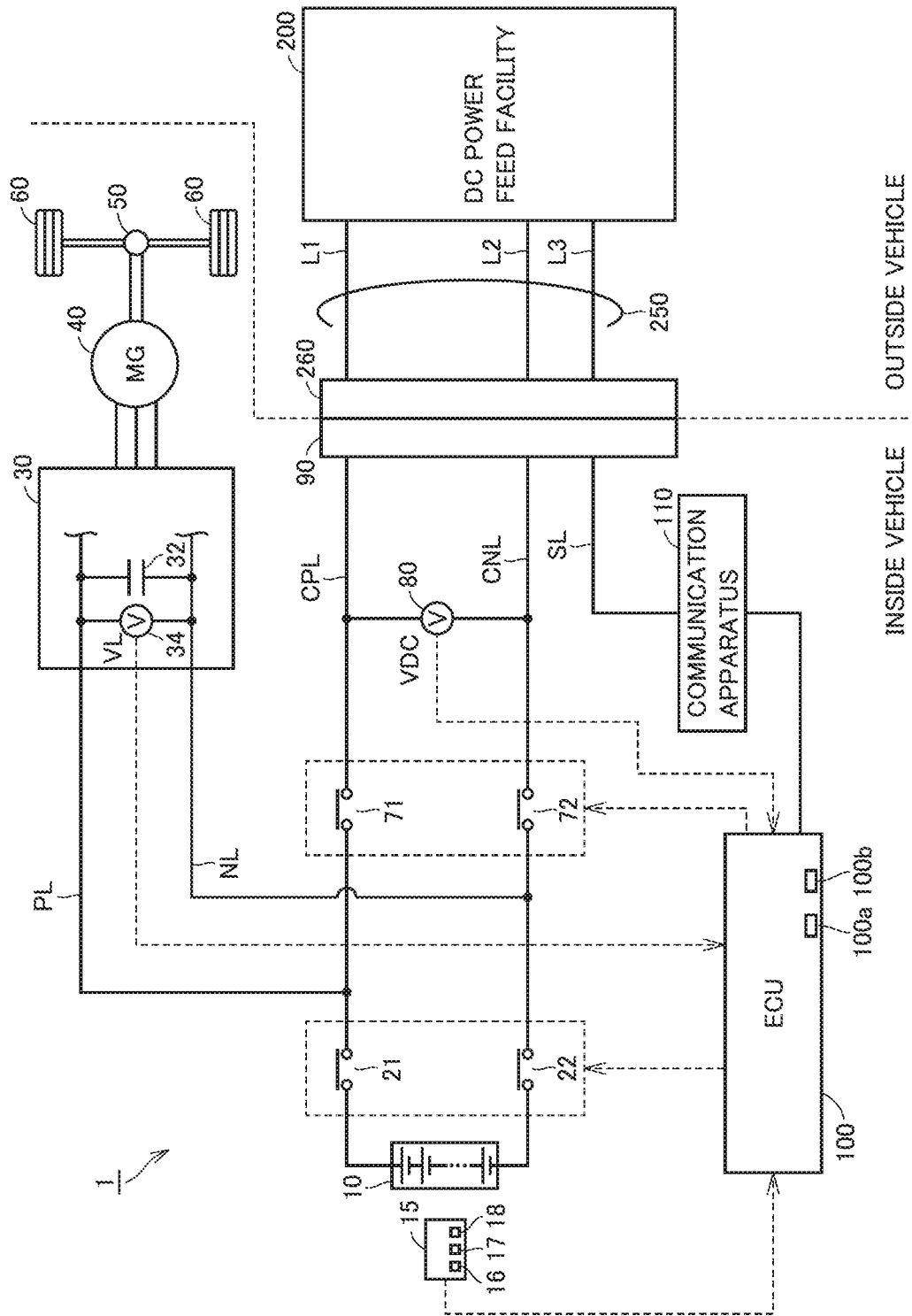
FIG. 1 is a block diagram showing an exemplary configuration of a charging system including a vehicle according to an embodiment.

An embodiment of the present disclosure will be described below in detail with reference to the drawings. The same or corresponding elements in the drawings have the same reference characters allotted and description thereof will not be repeated.

<Overall Configuration>

FIG. 1 is a block diagram showing an exemplary configuration of a charging system including a vehicle according to the present embodiment. Referring to FIG. 1, the charging system includes a vehicle 1, a DC power feed facility 200, and a charge cable 250. Though an example in which vehicle 1 according to the present embodiment is an electric vehicle is described, vehicle 1 may be capable of DC charging in which an incorporated power storage is charged by receiving DC power supplied from DC power feed facility 200, and it is not limited to an electric vehicle. For example, vehicle 1 may be a plug-in hybrid vehicle or a fuel cell vehicle.

DC power feed facility 200 is a facility for supplying DC power to vehicle 1 through charge cable 250. In DC charging, a connector 260 provided at a tip end of charge cable 250 is connected to a charge port (which will be described later) of vehicle 1.

Referring to FIG. 1, vehicle 1 includes a power storage 10, a monitoring unit 15, system main relays (which are each also referred to as an "SMR" below) 21 and 22, a power control unit (which is also referred to as a "PCU" below) 30, a motor generator (which is also referred to as an "MG" below) 40, a power transmission gear 50, a drive wheel 60, and an electronic control unit (ECU) 100. Vehicle 1 includes charge relays 71 and 72, a voltage sensor 80, a charge port 90, and a communication apparatus 110.

Power storage 10 is incorporated in vehicle 1 as a driving power supply (that is, a motive power source) of vehicle 1. Power storage 10 includes a plurality of stacked batteries. Examples of the battery include secondary batteries such as a nickel metal hydride battery and a lithium ion battery. The battery may be a battery containing a liquid electrolyte between a positive electrode and a negative electrode or a battery containing a solid electrolyte (an all-solid-state battery). Power storage 10 may be a rechargeable DC power supply and a large-capacity capacitor can also be adopted.

Monitoring unit 15 monitors a state of power storage 10. Specifically, monitoring unit 15 includes a voltage sensor 16, a current sensor 17, and a temperature sensor 18. Voltage sensor 16 detects a voltage of power storage 10. Current sensor 17 detects a current input to and output from power storage 10. Temperature sensor 18 detects a temperature of power storage 10. Each sensor outputs a result of detection thereby to ECU 100.

SMRs 21 and 22 are electrically connected between power storage 10 and power lines PL and NL. Specifically, SMR 21 has one end electrically connected to a positive electrode terminal of power storage 10 and has the other end electrically connected to power line PL. SMR 22 has one end electrically connected to a negative electrode terminal of power storage 10 and has the other end electrically connected to power line NL. Open/closed states of SMRs 21 and 22 are controlled by a control signal from ECU 100.

SMR 21 according to the present embodiment corresponds to one example of the "first relay" according to the present disclosure. SMR 22 according to the present embodiment corresponds to one example of the "second relay" according to the present disclosure. Power line PL according to the present embodiment corresponds to one example of the "first power line." Power line NL according to the present embodiment corresponds to one example of the "second power line."

PCU 30 is a collective denotation of a power conversion device for driving MG 40 by receiving electric power from power storage 10. PCU 30 is electrically connected to power lines PL and NL and controlled by ECU 100. PCU 30 includes, for example, an inverter that drives MG 40 or a converter that boosts electric power output from power storage 10 and supplies boosted electric power to the inverter.

PCU 30 includes a capacitor 32 and a voltage sensor 34. Capacitor 32 is connected between power lines PL and NL and smoothens a voltage VL between power lines PL and NL. Power line PL is electrically connected to the positive electrode terminal of power storage 10 with SMR 21 being interposed. Power line NL is electrically connected to the negative electrode terminal of power storage 10 with SMR 22 being interposed. Voltage sensor 34 detects a voltage across opposing ends of capacitor 32, that is, voltage VL between power lines PL and NL.

MG 40 is an alternating-current (AC) rotating electric machine and it is, for example, a permanent magnet synchronous motor including a rotor having a permanent magnet embedded. The rotor of MG 40 is mechanically connected to drive wheel 60 with power transmission gear 50 being interposed. MG 40 generates kinetic energy for running vehicle 1 by receiving AC power from PCU 30. Kinetic energy generated by MG 40 is transmitted to power transmission gear 50. When vehicle 1 is decelerated or stopped, MG 40 converts kinetic energy of vehicle 1 into electric energy. AC power generated by MG 40 is converted to DC power by PCU 30 and DC power is supplied to power storage 10. Regenerated power can thus be stored in power storage 10. MG 40 thus generates driving force or braking force of vehicle 1, with supply and reception of electric power to and from power storage 10 (that is, charging and discharging of power storage 10).

When vehicle 1 is a plug-in hybrid vehicle further including an engine (not shown) as a motive power source, engine output in addition to output from MG 40 can be used as driving force for running. Alternatively, a motor generator (not shown) that generates electric power by using engine output can also further be incorporated to generate charging power for power storage 10 with engine output.

Charge relays 71 and 72 are electrically connected between power lines PL and NL and charge port 90. Specifically, charge relay 71 has one end electrically connected to power line PL and the other end electrically connected to charge port 90 with a power line CPL being interposed. Charge relay 72 has one end electrically connected to power line NL and the other end electrically connected to charge port 90 with a power line CNL being interposed. Open/closed states of charge relays 71 and 72 are controlled by a control signal from ECU 100.

Charge port 90 is configured such that connector 260 provided at the tip end of charge cable 250 of DC power feed facility 200 can be connected thereto. Charge cable 250 includes power lines L1 and L2 and a communication signal line L3. When connector 260 is connected to charge port 90, power lines L1 and L2 and communication signal line L3 of DC power feed facility 200 are connected to power lines CPL and CNL and a communication signal line SL of vehicle 1, respectively.

Voltage sensor 80 detects a potential difference between power lines CPL and CNL. Voltage sensor 80 detects a voltage VDC of charge port 90. Voltage sensor 80 outputs a result of detection to ECU 100.

Communication apparatus 110 can communicate with DC power feed facility 200 through communication signal line SL. Communication between vehicle 1 and DC power feed facility 200 is, for example, communication in conformity with a controller area network (CAN) communication protocol (which is also referred to as "CAN communication" below). Communication between vehicle 1 and DC power feed facility 200 is not limited to CAN communication and may be power line communication (PLC) or wireless communication.

ECU 100 includes a central processing unit (CPU) 100$a$, a memory 100$b$, and an input and output buffer (not shown), receives input of signals from various sensors or outputs a control signal to each device, and controls each device. Control is not limited to processing by software and control based on construction of dedicated hardware (electronic circuits) and processing thereby are also applicable.

ECU 100 can calculate a state of charge (SOC) of power storage 10. Various known approaches by using a voltage of power storage 10 detected by monitoring unit 15 and a current input to and output from power storage 10 can be adopted as a method of calculating an SOC of power storage 10.

ECU 100 outputs a calculated SOC of power storage 10 or a voltage of power storage 10 to DC power feed facility 200 through communication apparatus 110. ECU 100 transmits various commands such as an output command requesting DC power feed facility 200 to output electric power, a stop command requesting the DC power feed facility to stop output of electric power, and a charging current command value through communication apparatus 110.

ECU 100 controls open/closed states of SMRs 21 and 22. ECU 100 controls open/closed states of charge relays 71 and 72.

When DC charging is performed, ECU 100 controls all of SMRs 21 and 22 and charge relays 71 and 72 to be closed and transmits an output command to DC power feed facility 200 through communication apparatus 110. While DC charging is being performed, ECU 100 transmits a charging current command value to DC power feed facility 200 through communication apparatus 110 at a prescribed time interval.

DC power feed facility 200 starts supply of electric power to charge port 90 of vehicle 1 in accordance with the output command received from vehicle 1. DC power feed facility 200 outputs a current corresponding to the charging current command value received from vehicle 1.

<First Diagnosis Processing and Second Diagnosis Processing>

Charge relays 71 and 72 may stick. When charge relay 71 and/or charge relay 72 stick(s), power storage 10 cannot be charged. In particular, when charge relay 71 and/or charge relay 72 stick(s) in the closed state, a voltage of power storage 10 may be applied to charge port 90 at unintended timing.

Then, after completion of DC charging, vehicle 1 performs first diagnosis processing for diagnosing whether or not charge relay 71 and/or charge relay 72 have/has stuck in the closed state. The first diagnosis processing refers to processing performed with SMRs 21 and 22 being closed, for diagnosing whether or not charge relay 71 and/or charge relay 72 have/has stuck based on an open/close command to charge relays 71 and 72 and voltage VDC detected by voltage sensor 80. Completion of DC charging refers to a state that a condition to quit DC charging is satisfied. For example, a condition that an SOC of power storage 10 is equal to or higher than a prescribed level or a condition that a prescribed time period has elapsed since start of DC charging is applicable as the condition for quitting DC charging.

First diagnosis processing according to the present embodiment specifically includes first both-element diagnosis processing and first one-element diagnosis processing. First both-element diagnosis processing is processing for diagnosing whether or not both of charge relays 71 and 72 have stuck. First one-element diagnosis processing is processing for diagnosing whether or not each of charge relays 71 and 72 has stuck. First diagnosis processing will be described in detail with reference to FIGS. 2, 3, and 4.

Figure 2:
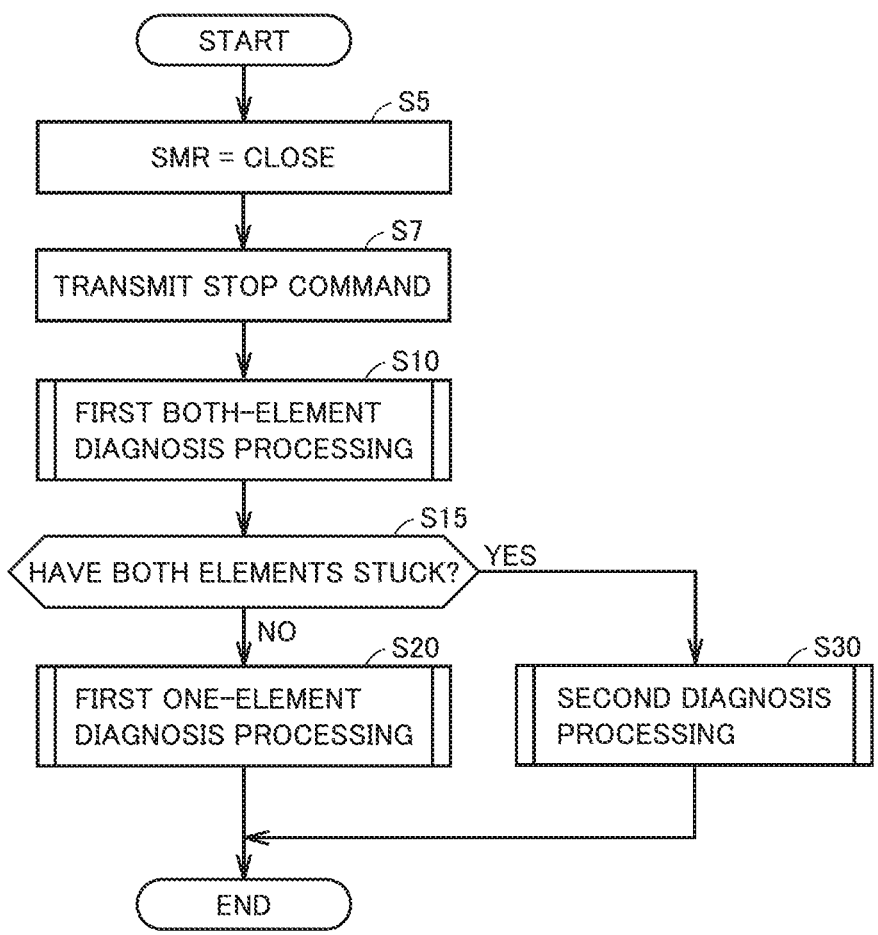
FIG. 2 is a flowchart showing a procedure in first diagnosis processing according to the embodiment.
Figure 3:
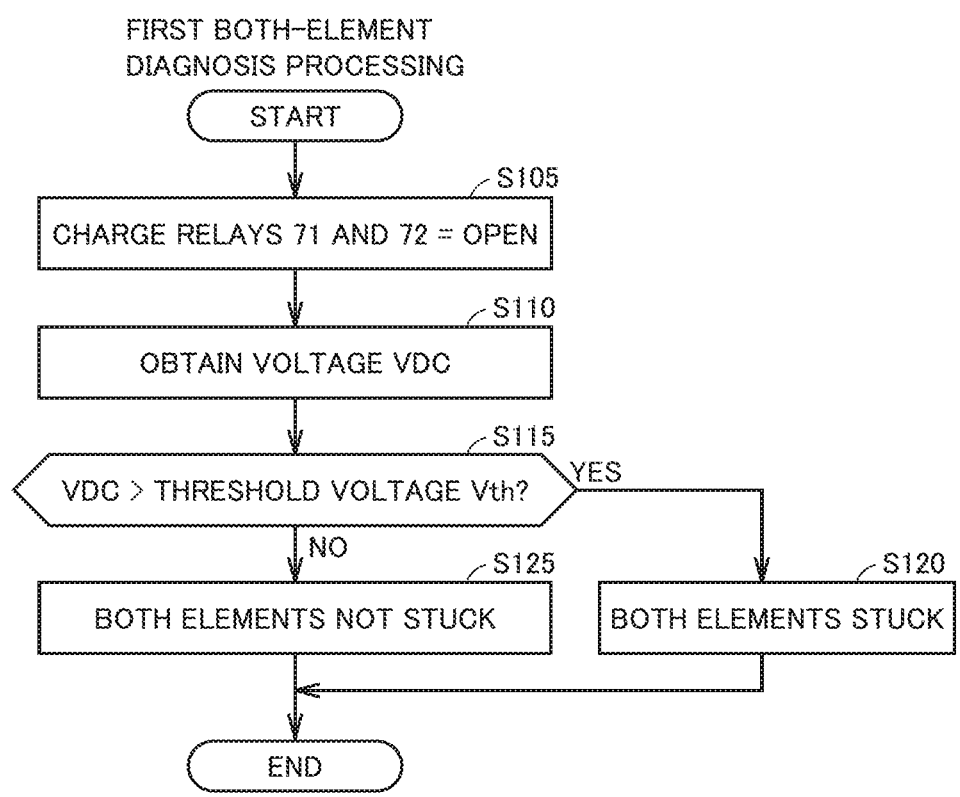
FIG. 3 is a flowchart showing a procedure in first both-element diagnosis processing included in the first diagnosis processing.
Figure 4:
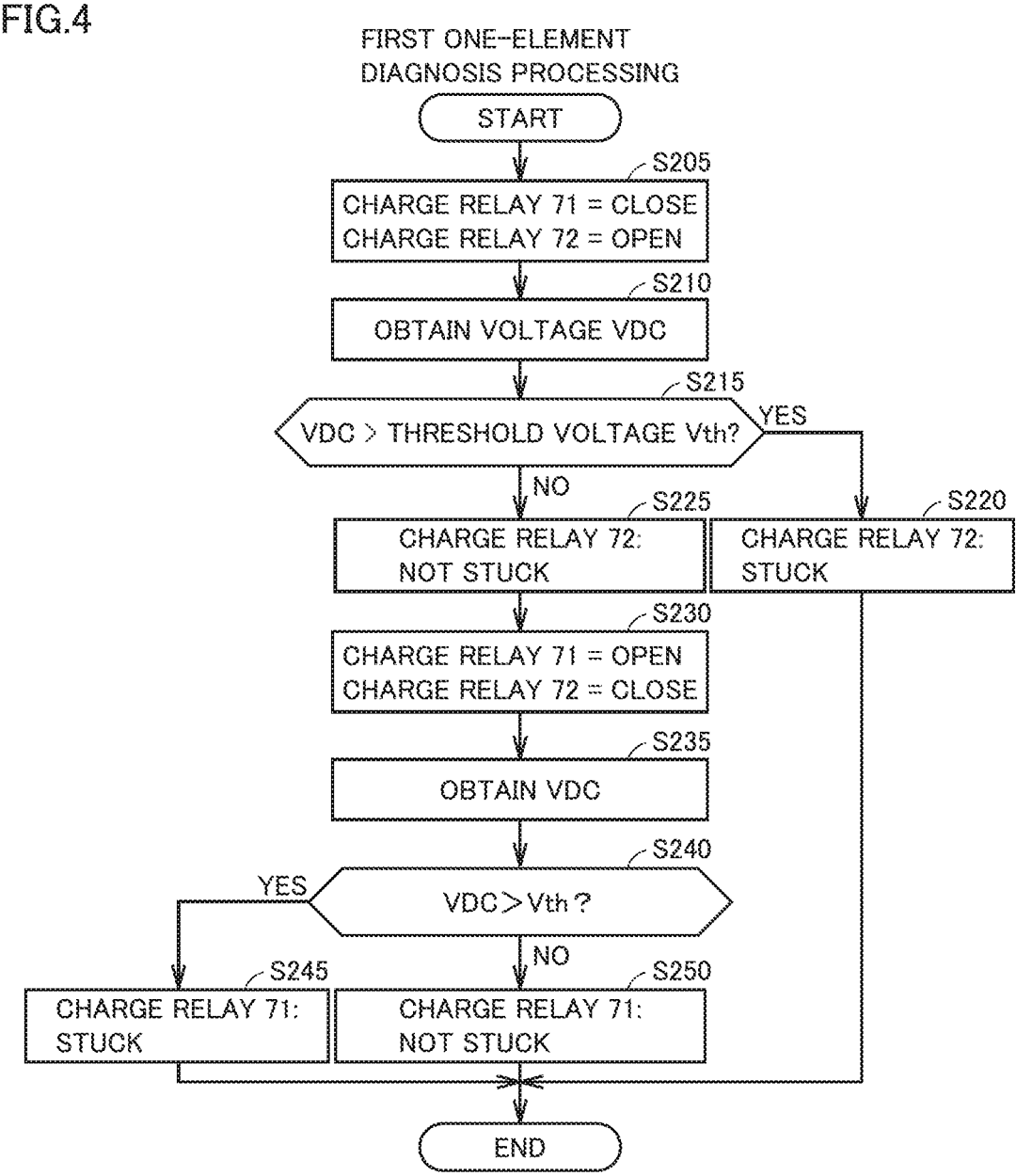
FIG. 4 is a flowchart showing a procedure in first one-element diagnosis processing included in the first diagnosis processing.

FIG. 2 is a flowchart showing a procedure in first diagnosis processing according to the present embodiment. This flowchart is performed by ECU 100 of vehicle 1 after DC charging of vehicle 1 is completed. FIG. 3 is a flowchart showing a procedure in first both-element diagnosis processing included in the first diagnosis processing. FIG. 4 is a flowchart showing a procedure in first one-element diagnosis processing included in the first diagnosis processing. Though an example in which each step (the step being abbreviated as "S" below) in the flowcharts shown in FIGS. 2 to 4 and FIGS. 5 to 9 which will be described later is performed by software processing by ECU 100 is described, the step may be performed partially or entirely by hardware (electrical circuits) fabricated in ECU 100. First diagnosis processing is performed with connector 260 of charge cable 250 being connected to charge port 90.

Referring to FIG. 2, as DC charging of vehicle 1 is completed, ECU 100 outputs a command to close SMRs 21 and 22 to close SMRs 21 and 22 (S5). When SMRs 21 and 22 are closed after completion of DC charging, the closed state should only be maintained.

ECU 100 transmits a stop command requesting DC power feed facility 200 to stop output of electric power through communication apparatus 110 (S7).

Then, ECU 100 performs first both-element diagnosis processing (S10). Referring to FIG. 3, in first both-element diagnosis processing, ECU 100 outputs a command to open both of charge relays 71 and 72 (S105).

Then, ECU 100 obtains voltage VDC detected by voltage sensor 80 (S110) and compares voltage VDC with a threshold voltage Vth (S115). Threshold voltage Vth is a threshold value for determining whether or not the voltage of power storage 10 is being applied to charge port 90 through SMRs 21 and 22, charge relays 71 and 72, and power lines CPL and CNL in first diagnosis processing. Threshold voltage Vth is set, for example, to a value lower than a voltage at a lower limit SOC of power storage 10.

When voltage VDC is higher than threshold voltage Vth in S115, that is, when voltage sensor 80 detects a voltage of power storage 10 in spite of output of an open command to charge relays 71 and 72, it can be concluded that both of charge relays 71 and 72 have stuck in the closed state. Therefore, when voltage VDC is higher than threshold voltage Vth in S115 (YES in S115), ECU 100 determines that both of charge relays 71 and 72 have stuck in the closed state (both elements stuck) (S120).

When voltage VDC is equal to or lower than threshold voltage Vth in S115 (NO in S115), ECU 100 determines that both of charge relays 71 and 72 have not stuck in the closed state (both elements not stuck), that is, at least one of charge relays 71 and 72 is open in accordance with the open command (S125).

When ECU 100 determines that both of the elements have stuck or have not stuck in S120 or S125, it quits first both-element diagnosis processing.

Referring again to FIG. 2, when ECU 100 determines that both of charge relays 71 and 72 have not stuck in the closed state (both elements not stuck) in first both-element diagnosis processing (NO in S15), it performs first one-element diagnosis processing and diagnoses whether or not each of charge relays 71 and 72 has stuck (s20).

Referring to FIG. 4, in first one-element diagnosis processing, ECU 100 initially diagnoses whether or not charge relay 72 has stuck. Specifically, ECU 100 outputs a command to close charge relay 71 and to open charge relay 72 (S205).

ECU 100 obtains voltage VDC detected by voltage sensor 80 (S210) and compares voltage VDC with threshold voltage Vth (S215). When charge relay 72 is open in accordance with the open command, voltage VDC detected by voltage sensor 80 is expected to be equal to or lower than threshold voltage Vth in S215. When charge relay 72 has stuck in the closed state, both of charge relays 71 and 72 are closed and hence the voltage of power storage 10 is applied to charge port 90. Therefore, voltage VDC detected by voltage sensor 80 is expected to be higher than threshold voltage Vth.

When voltage VDC is higher than threshold voltage Vth (YES in S215), ECU 100 determines that charge relay 72 has stuck in the closed state (S220). Since both of charge relays 71 and 72 have not been determined as having stuck in the closed state in first both-element diagnosis processing in this case, it can be concluded that charge relay 71 is normally operating. Therefore, ECU 100 quits first one-element diagnosis processing without diagnosing whether or not charge relay 71 has stuck.

When voltage VDC is equal to or lower than threshold voltage Vth (NO in S215), ECU 100 determines that charge relay 72 has not stuck in the closed state (S225). Then, ECU 100 determines whether or not charge relay 71 has stuck.

ECU 100 outputs a command to open charge relay 71 and to close charge relay 72 (S230).

Then, ECU 100 obtains voltage VDC detected by voltage sensor 80 (S235) and compares voltage VDC with threshold voltage Vth (S240). When charge relay 71 is open in accordance with the open command in this case, voltage VDC detected by voltage sensor 80 is expected to be equal to or lower than threshold voltage Vth. When charge relay 71 has stuck in the closed state, both of charge relays 71 and 72 are closed and hence a voltage of power storage 10 is applied to charge port 90. Therefore, voltage VDC detected by voltage sensor 80 is expected to be higher than threshold voltage Vth.

When voltage VDC is higher than threshold voltage Vth (YES in S240), ECU 100 determines that charge relay 71 has stuck in the closed state (S245).

When voltage VDC is equal to or lower than threshold voltage Vth (NO in S240), ECU 100 determines that charge relay 71 has not stuck in the closed state (S250). In this case, neither of charge relays 71 and 72 have stuck and charge relays 71 and 72 are determined as being normal.

When ECU 100 determines whether or not charge relay 71 has stuck in S245 or S250, it quits first one-element diagnosis processing.

The order of diagnosing charge relays 71 and 72 in first one-element diagnosis processing is not particularly limited. Though an example in which whether or not charge relay 72 has stuck is initially diagnosed and thereafter whether or not charge relay 71 has stuck is diagnosed is described above, whether or not charge relay 71 has stuck may be diagnosed and thereafter whether or not charge relay 72 has stuck may be diagnosed. This is also applicable to second one-element diagnosis processing which will be described later.

Referring again to FIG. 2, when both of charge relays 71 and 72 are determined as having stuck in the closed state (both elements stuck) in the first both-element diagnosis processing (YES in S15), ECU 100 may finalize a result of determination and quit the first diagnosis processing.

Among current DC power feed facilities 200, there is a DC power feed facility that is not in conformity with a prescribed charging standard (for example, the CHAdeMO (trademark) standard, the CCS standard, and the GB/T standard). DC power feed facility 200 in conformity with the prescribed charging standard could control from a side of vehicle 1, output/stop of electric power from DC power feed facility 200. For example, when DC power feed facility 200 in conformity with the prescribed charging standard receives an output command from vehicle 1, it starts supply of electric power in accordance with the output command. When DC power feed facility 200 in conformity with the prescribed charging standard receives a stop command from vehicle 1, it stops supply of electric power to the vehicle in accordance with the stop command.

Among DC power feed facilities 200 not in conformity with the prescribed charging standard, however, there is a DC power feed facility (a specific DC power feed facility) that does not stop, in spite of reception of a stop command from vehicle 1, supply of electric power without obeying the stop command. When DC power feed facility 200 falls under the specific DC power feed facility, supply of electric power from DC power feed facility 200 may not be stopped in spite of transmission of the stop command from vehicle 1 to DC power feed facility 200 in S7. When DC power feed facility 200 falls under the specific DC power feed facility, electric power may unintentionally be supplied from DC power feed facility 200 to the vehicle.

When electric power is being supplied from DC power feed facility 200 in first both-element diagnosis processing, in spite, for example, of charge relays 71 and 72 being appropriately open in accordance with the open command, voltage sensor 80 detects a voltage of electric power from DC power feed facility 200. Therefore, erroneous diagnosis that charge relay 71 and charge relay 72 have stuck in the closed state may be made. A case that both elements are determined as having stuck in first both-element diagnosis processing includes a case of sticking of charge relays 71 and 72 as indicated in the result of determination and a case of erroneous diagnosis due to the voltage applied by DC power feed facility 200 to charge port 90.

Then, when both of charge relays 71 and 72 are determined as having stuck in the closed state (both elements stuck) in the first both-element diagnosis processing (YES in S15), second diagnosis processing on the assumption that DC power feed facility 200 falls under the specific DC power feed facility is performed (S30). The second diagnosis processing refers to processing performed with SMRs 21 and 22 being open, for diagnosing whether or not charge relay 71 and/or charge relay 72 have/has stuck based on an open/close command to charge relays 71 and 72, voltage VL detected by voltage sensor 34, and voltage VDC detected by voltage sensor 80. By performing second diagnosis processing, in spite of unintended supply of electric power from DC power feed facility 200 to vehicle 1, whether or not charge relay 71 and/or charge relay 72 have/has stuck can appropriately be diagnosed. The second diagnosis processing will be described in detail with reference to FIGS. 5, 6, and 7.

Figure 5:
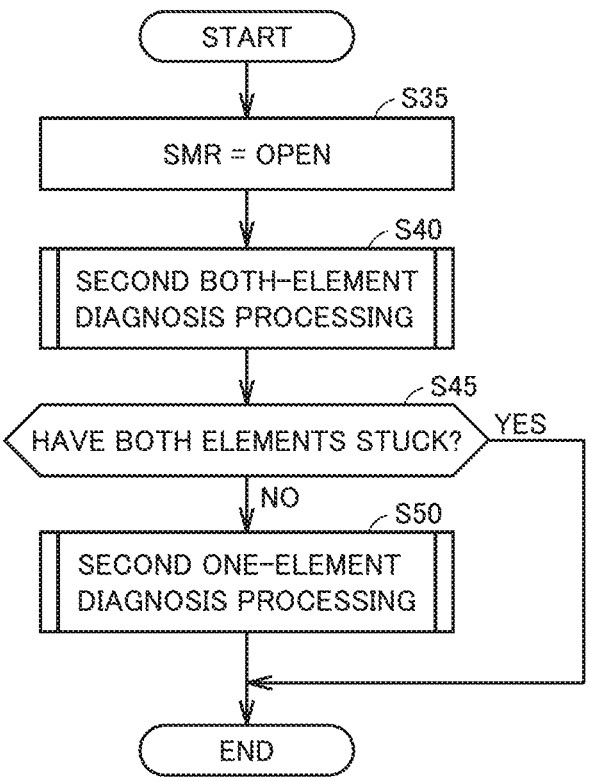
FIG. 5 is a flowchart showing a procedure in second diagnosis processing according to the embodiment.
Figure 6:
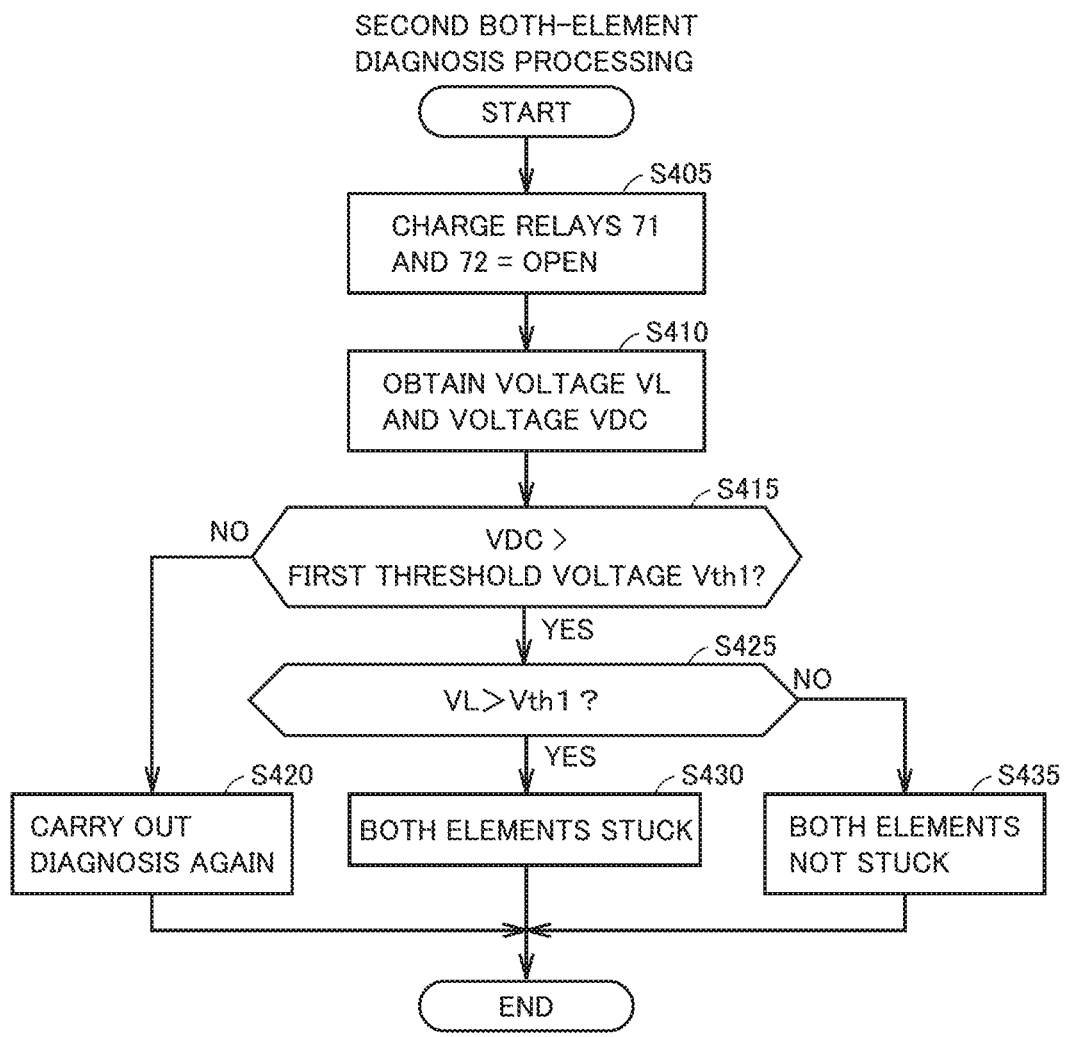
FIG. 6 is a flowchart showing a procedure in second both-element diagnosis processing included in the second diagnosis processing.
Figure 7:
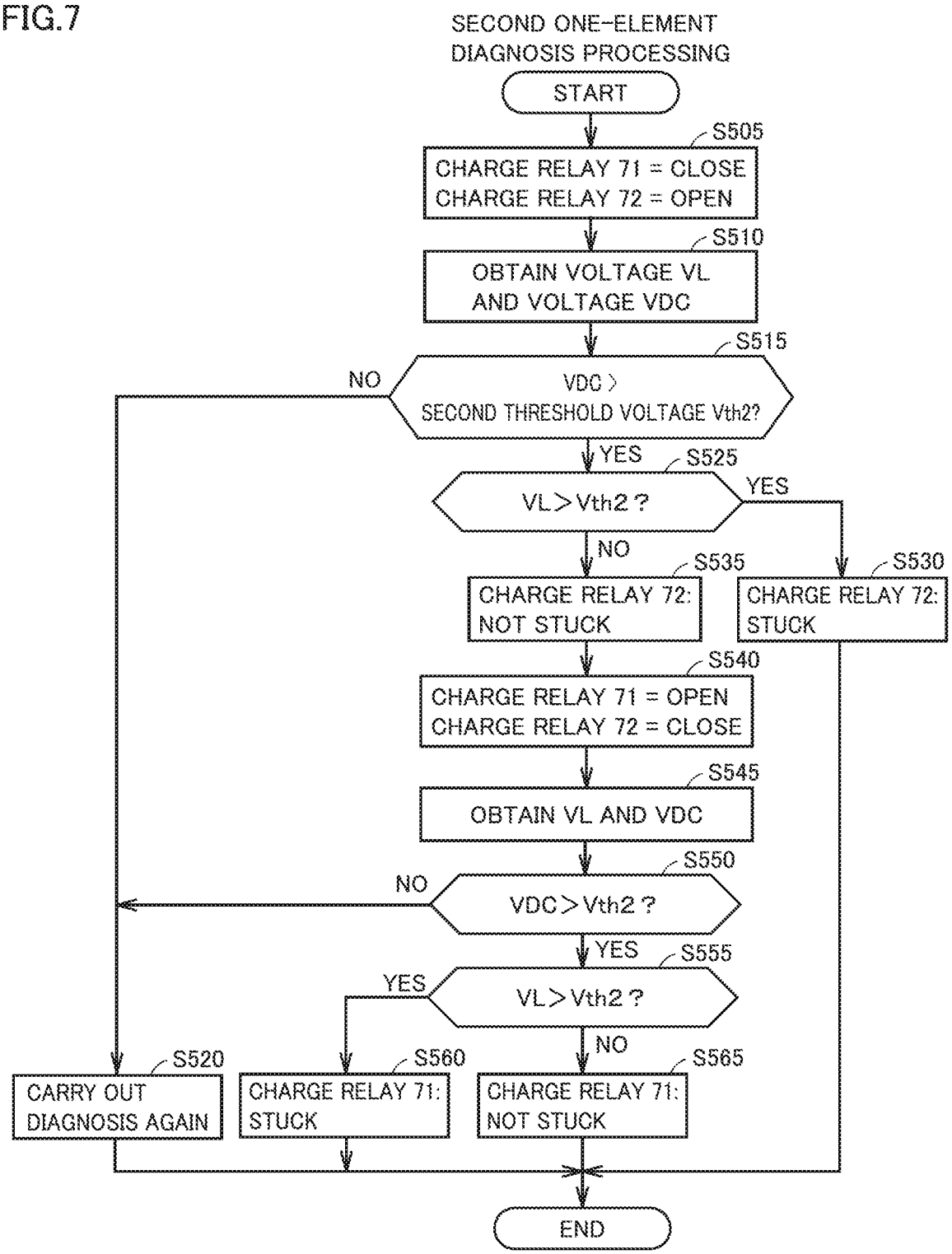
FIG. 7 is a flowchart showing a procedure in second one-element diagnosis processing included in the second diagnosis processing.

FIG. 5 is a flowchart showing a procedure in second diagnosis processing according to the present embodiment. The second diagnosis processing according to the present embodiment specifically includes second both-element diagnosis processing (S40) and second one-element diagnosis processing (S50). The second both-element diagnosis processing refers to processing for diagnosing whether or not both of charge relays 71 and 72 have stuck. The second one-element diagnosis processing refers to processing for diagnosing whether or not each of charge relays 71 and 72 has stuck. FIG. 6 is a flowchart showing a procedure in second both-element diagnosis processing included in the second diagnosis processing. FIG. 7 is a flowchart showing a procedure in second one-element diagnosis processing included in the second diagnosis processing.

The second both-element diagnosis processing according to the present embodiment corresponds to one example of the "both-element diagnosis processing" according to the present disclosure. The second one-element diagnosis processing according to the present embodiment corresponds to one example of the "one-element diagnosis processing" according to the present disclosure.

Referring to FIG. 5, ECU 100 outputs a command to open SMRs 21 and 22 to open SMRs 21 and 22 (S35). As SMRs 21 and 22 are opened, control for discharging charges stored in capacitor 32 of PCU 30 is carried out. Under such control, for example, by driving the inverter included in PCU 30, charges stored in capacitor 32 are consumed. Voltage VL detected by voltage sensor 34 is thus lowered, for example, to a voltage around 0 V.

ECU 100 performs second both-element diagnosis processing (S40). Referring to FIG. 6, in second both-element diagnosis processing, ECU 100 outputs a command to open both of charge relays 71 and 72 (S405).

Then, ECU 100 obtains voltage VL detected by voltage sensor 34 and voltage VDC detected by voltage sensor 80 (S410).

Then, ECU 100 compares voltage VDC with a first threshold voltage Vth1 (S415). ECU 100 compares voltage VL with first threshold voltage Vth1 (S425). First threshold voltage Vth1 is a threshold value for determining whether or not the voltage is being applied by DC power feed facility 200 to charge port 90 in second both-element diagnosis processing. First threshold voltage Vth1 is used also as a threshold value for determining, when the voltage is being applied by DC power feed facility 200 to charge port 90, whether or not the voltage is input to PCU 30 through power lines CPL and CNL, charge relays 71 and 72, and power lines PL and NL. First threshold voltage Vth1 is set to a value lower than the lower limit of a voltage that can be applied by DC power feed facility 200 to vehicle 1. First threshold voltage Vth1 is set, for example, to a value approximately from several V to several ten V.

When voltage VDC is higher than first threshold voltage Vth1 with SMRs 21 and 22 being open, it can be assumed that the voltage is being applied by DC power feed facility 200 to charge port 90. When both of charge relays 71 and 72 have stuck in the closed state in this case, voltage VL is expected to be higher than first threshold voltage Vth1. When at least one of charge relays 71 and 72 is open in accordance with the open command, voltage VL is expected to be equal to or lower than first threshold voltage Vth1.

When voltage VDC is higher than first threshold voltage Vth1 (YES in S415) and voltage VL is higher than first threshold voltage Vth1 (YES in S425), ECU 100 determines that both of charge relays 71 and 72 have stuck in the closed state (both elements stuck) (S430).

When voltage VDC is higher than first threshold voltage Vth1 (YES in S415) and voltage VL is equal to or lower than first threshold voltage Vth1 (NO in S425), ECU 100 determines that both of charge relays 71 and 72 have not stuck in the closed state (both elements not stuck), that is, at least one of charge relays 71 and 72 is open in accordance with the open command (S435).

When voltage VDC is equal to or lower than first threshold voltage Vth1 in S415 (NO in S415), ECU 100 performs again first diagnosis processing (re-diagnosis) (S420). This is because, when voltage VDC is equal to or lower than first threshold voltage Vth1 in S415 in second diagnosis processing (specifically, second both-element diagnosis processing), DC power feed facility 200 may have stopped supply of electric power in accordance with the stop command (S7 in FIG. 2) received from vehicle 1 in first diagnosis processing during a period from end of execution of first diagnosis processing until start of execution of second diagnosis processing. DC power feed facility 200 may have stopped supply of electric power with a time lag behind reception of the stop command. When there is such a possibility, the first diagnosis processing is performed again. Thus, diagnosis can be redone with supply of electric power from DC power feed facility 200 having been stopped, and whether or not charge relay 71 and/or charge relay 72 have/has stuck can be diagnosed.

When diagnosis as both elements stuck is made again also in the first both-element diagnosis processing in re-diagnosis (YES in S15 in FIG. 2), both of charge relays 71 and 72 are determined as having stuck without performing second diagnosis processing. Since it has been confirmed that voltage VDC is equal to or lower than first threshold voltage Vth1, that is, no electric power is being supplied from DC power feed facility 200 to vehicle 1, in S415 in second both-element diagnosis processing, both of charge relays 71 and 72 can be determined as having stuck in the first both-element diagnosis processing in re-diagnosis.

Referring again to FIG. 5, when ECU 100 determines that both of charge relays 71 and 72 have stuck in the closed state (both elements stuck) in second both-element diagnosis processing (YES in S45), it quits the process.

When ECU 100 determines that both of charge relays 71 and 72 have not stuck in the closed state (both elements not stuck) in second both-element diagnosis processing (NO in S45), it performs second one-element diagnosis processing and diagnoses whether or not each of charge relays 71 and 72 has stuck (S50).

FIG. 7 is a flowchart showing a procedure in second one-element diagnosis processing included in the second diagnosis processing. Referring to FIG. 7, in second one-element diagnosis processing, ECU 100 initially diagnoses whether or not charge relay 72 has stuck. Specifically, ECU 100 outputs a command to close charge relay 71 and to open charge relay 72 (S505).

ECU 100 obtains voltage VL detected by voltage sensor 34 and voltage VDC detected by voltage sensor 80 (S510).

Then, ECU 100 compares voltage VDC with a second threshold voltage Vth2 (S515). ECU 100 compares voltage VL with second threshold voltage Vth2 (S525). Second threshold voltage Vth2 is a threshold value for determining whether or not a voltage is being applied by DC power feed facility 200 to charge port 90 in second one-element diagnosis processing. Second threshold voltage Vth2 is used also as a threshold value for determining, when a voltage is being applied by DC power feed facility 200 to charge port 90, whether or not the voltage is input to PCU 30 through power lines CPL and CNL, charge relays 71 and 72, and power lines PL and NL. Second threshold voltage Vth2 is set to a value lower than the lower limit of the voltage that can be applied by DC power feed facility 200 to vehicle 1. Second threshold voltage Vth2 is set to a value, for example, approximately from several V to several ten V. Second threshold voltage Vth2 may be set, for example, to a value the same as first threshold voltage Vth1.

When voltage VDC is higher than second threshold voltage Vth2 with SMRs 21 and 22 being open, it can be assumed that the voltage is being applied by DC power feed facility 200 to charge port 90. When charge relay 72 is open in accordance with the open command in this case, voltage VL detected by voltage sensor 34 is expected to be equal to or lower than second threshold voltage Vth2. When charge relay 72 has stuck in the closed state, both of charge relays 71 and 72 are closed and hence a voltage from DC power feed facility 200 is input to PCU 30. Therefore, voltage VL detected by voltage sensor 34 is expected to be higher than second threshold voltage Vth2.

When voltage VDC is higher than second threshold voltage Vth2 (YES in S515) and voltage VL is higher than second threshold voltage Vth2 (YES in S525), ECU 100 determines that charge relay 72 has stuck in the closed state (S530). Since both of charge relays 71 and 72 have not been determined as having stuck in the closed state in second both-element diagnosis processing in this case, it can be concluded that charge relay 71 is normally operating. Therefore, ECU 100 quits second one-element diagnosis processing without diagnosing whether or not charge relay 71 has stuck.

When voltage VDC is higher than second threshold voltage Vth2 (YES in S515) and voltage VL is equal to or lower than second threshold voltage Vth2 (NO in S525), ECU 100 determines charge relay 72 as not having stuck in the closed state (S535). Then, ECU 100 diagnoses whether or not charge relay 71 has stuck.

ECU 100 outputs a command to open charge relay 71 and to close charge relay 72 (S540).

ECU 100 obtains voltage VL detected by voltage sensor 34 and voltage VDC detected by voltage sensor 80 (S545).

Then, ECU 100 compares voltage VDC with second threshold voltage Vth2 (S550). ECU 100 compares voltage VL with second threshold voltage Vth2 (S555).

When voltage VDC is higher than second threshold voltage Vth2 with SMRs 21 and 22 being open, it can be assumed that a voltage is being applied by DC power feed facility 200 to charge port 90. When charge relay 71 is open in accordance with the open command in this case, voltage VL detected by voltage sensor 34 is expected to be equal to or lower than second threshold voltage Vth2. When charge relay 71 has stuck in the closed state, both of charge relays 71 and 72 are closed and hence a voltage from DC power feed facility 200 is input to PCU 30. Therefore, voltage VL detected by voltage sensor 34 is expected to be higher than second threshold voltage Vth2.

When voltage VDC is higher than second threshold voltage Vth2 (YES in S550) and voltage VL is higher than second threshold voltage Vth2 (YES in S555), ECU 100 determines charge relay 71 as having stuck in the closed state (S560).

When voltage VDC is higher than second threshold voltage Vth2 (YES in S550) and voltage VL is equal to or lower than second threshold voltage Vth2 (NO in S555), ECU 100 determines charge relay 71 as not having stuck in the closed state (S565). In this case, neither of charge relays 71 and 72 have stuck and charge relays 71 and 72 are determined as being normal.

When voltage VDC is equal to or lower than second threshold voltage Vth2 in S515 and S550 (NO in S515 and NO in S550), DC power feed facility 200 may have stopped supply of electric power in accordance with the stop command (S7 in FIG. 2) received from vehicle 1 in the first diagnosis processing during a period from end of execution of the first diagnosis processing until start of execution of the second one-element diagnosis processing. DC power feed facility 200 may have stopped supply of electric power with a time lag behind reception of the stop command. When there is such a possibility, whether or not charge relay 71 and/or charge relay 72 have/has stuck can be diagnosed by performing again the first diagnosis processing (re-diagnosis) as in the second both-element diagnosis processing (S520).

As set forth above, vehicle 1 according to the present embodiment performs first diagnosis processing for diagnosing whether or not charge relay 71 and/or charge relay 72 have/has stuck after completion of DC charging. When both of charge relays 71 and 72 are determined as having stuck in the first both-element diagnosis processing in the first diagnosis processing, second diagnosis processing on the assumption that DC power feed facility 200 falls under the specific DC power feed facility is performed. By performing the second diagnosis processing, even though DC power feed facility 200 falls under the specific DC power feed facility and electric power is unintentionally supplied from DC power feed facility 200 to vehicle 1, whether or not charge relay 71 and/or charge relay 72 have/has stuck can appropriately be diagnosed.

(First Modification)

An example in which second diagnosis processing includes second both-element diagnosis processing and second one-element diagnosis processing and the second both-element diagnosis processing is initially performed and thereafter the second one-element diagnosis processing is performed in accordance with a result of the performed second both-element diagnosis processing is described in the embodiment. The second diagnosis processing, however, does not have to include the second both-element diagnosis processing.

Figure 8:
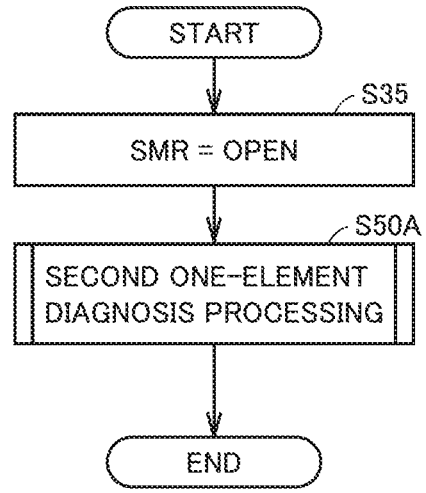
FIG. 8 is a flowchart showing a procedure in second diagnosis processing according to a first modification.
Figure 9:
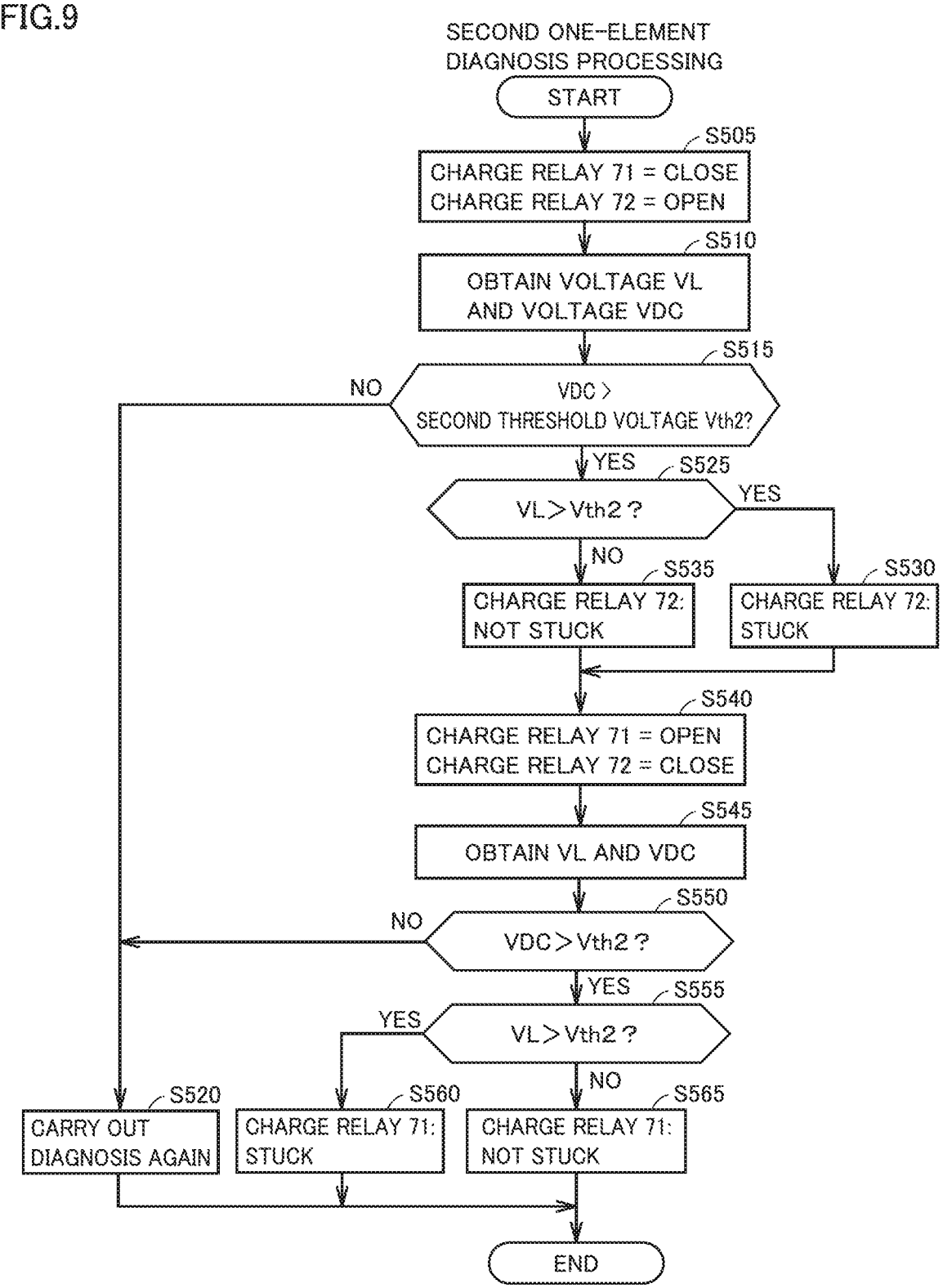
FIG. 9 is a flowchart showing a procedure in second one-element diagnosis processing included in the second diagnosis processing according to the first modification.

FIG. 8 is a flowchart showing a procedure in second diagnosis processing according to a first modification. This flowchart is performed by ECU 100 of vehicle 1 after completion of DC charging as in the embodiment. FIG. 9 is a flowchart showing a procedure in second one-element diagnosis processing included in the second diagnosis processing according to the first modification. Second one-element diagnosis processing shown in FIG. 9 is different from the flowchart shown in FIG. 7 in steps performed after processing in S530. Specifically, second one-element diagnosis processing ends after the processing in S530 in the flowchart shown in FIG. 7, whereas the process proceeds to S540 after the processing in S530 and whether or not charge relay 71 has stuck is diagnosed in the flowchart shown in FIG. 9. In second one-element diagnosis processing according to the first modification, regardless of a result of diagnosis of sticking of one charge relay (for example, charge relay 72), sticking of the other charge relay (for example, charge relay 71) is also diagnosed. Since processing performed in each step is the same as in the flowchart in FIG. 7, description will not be repeated.

Referring to FIGS. 8 and 9, as DC charging of vehicle 1 is completed, ECU 100 outputs a command to open SMRs 21 and 22 to open SMRs 21 and 22 (S35). Then, ECU 100 performs second one-element diagnosis processing (S50A).

As shown in FIG. 9, in the second one-element diagnosis processing, whether or not each of charge relays 71 and 72 has stuck in the closed state is determined (S530, S535, S560, and S565).

An effect as in the embodiment can be achieved also by performing second diagnosis processing according to the first modification when both of charge relays 71 and 72 are determined as having stuck in the first both-element diagnosis processing in the first diagnosis processing.

(Second Modification)

Though whether or not a voltage is applied to charge port 90 is determined based on a detection value from voltage sensor 80 in the present embodiment and the first modification, another sensor for determining whether or not a voltage is applied to charge port 90 may be employed. For example, a sensor that outputs an on signal when a voltage applied to charge port 90 is higher than a first prescribed voltage and outputs an off signal when the voltage applied to charge port 90 is equal to or lower than a second prescribed voltage may be employed. Specifications may be such that a signal is not transmitted when a voltage applied to charge port 90 is equal to or lower than the second prescribed voltage. The first prescribed voltage may be identical to or different from the second prescribed voltage in value.

In this case, when ECU 100 receives an on signal from the sensor, it determines that a voltage is being applied by DC power feed facility 200 or power storage 10 to charge port 90. When ECU 100 receives an off signal from the sensor, it determines that a voltage is not being applied by DC power feed facility 200 or power storage 10 to charge port 90.

(Third Modification)

An example in which, when both of charge relays 71 and 72 are determined as having stuck in second both-element diagnosis processing or when any one of charge relays 71 and 72 is determined as having stuck in second one-element diagnosis processing, diagnosis as having stuck is finalized by a result of one determination is described in the present embodiment and the first and second modifications. Diagnosis as having stuck, however, may be finalized, for example, when determination as having stuck is made a prescribed number of times.

For example, when both of charge relays 71 and 72 are determined as having stuck in second both-element diagnosis processing, first diagnosis processing is performed again. Then, when second both-element diagnosis processing is performed again and both of charge relays 71 and 72 are determined as having stuck, determination as both of charge relays 71 and 72 having stuck may be finalized.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle comprising:
    a power storage chargeable by receiving electric power supplied through a charge cable from a power feed facility outside the vehicle;
    a first power line and a second power line;
    a first relay electrically connected between a positive electrode of the power storage and the first power line;
    a second relay electrically connected between a negative electrode of the power storage and the second power line;
    a charge port to which a connector provided in the charge cable can be connected;
    a first charge relay electrically connected between the first power line and the charge port;
    a second charge relay electrically connected between the second power line and the charge port;
    a first voltage sensor that detects a voltage applied by the power feed facility to the charge port;
    a second voltage sensor that detects a voltage between the first power line and the second power line;
    a communication apparatus that transmits a command to the power feed facility; and
    a controller that performs diagnosis processing for diagnosing whether the first charge relay and/or the second charge relay have/has stuck with the connector and the charge port being connected to each other, wherein
    the diagnosis processing includes first diagnosis processing and second diagnosis processing, the first diagnosis processing being performed with the first relay and the second relay being closed, the second diagnosis processing being performed with the first relay and the second relay being open,
    in the first diagnosis processing, the controller
        outputs a command to open both of the first charge relay and the second charge relay, transmits a stop command requesting stop of output of electric power to the power feed facility through the communication apparatus, and diagnoses sticking of the first charge relay and the second charge relay based on the voltage detected by the first voltage sensor, and
        starts the second diagnosis processing when the controller diagnoses both of the first charge relay and the second charge relay as having stuck,
    in the second diagnosis processing, the controller outputs an open or close command to each of the first charge relay and the second charge relay and determines whether the first charge relay and/or the second charge relay have/has stuck based on a first voltage detected by the first voltage sensor and a second voltage detected by the second voltage sensor.

2. The vehicle according to claim 1, wherein
    the second diagnosis processing includes both-element diagnosis processing for diagnosing whether both of the first charge relay and the second charge relay have stuck, and
    in the both-element diagnosis processing, the controller outputs a command to open both of the first charge relay and the second charge relay and determines whether the first charge relay and the second charge relay have stuck based on relation between the first voltage and a first threshold voltage and relation between the second voltage and the first threshold voltage.

3. The vehicle according to claim 2, wherein
    in the both-element diagnosis processing, when the first voltage is higher than the first threshold voltage and the second voltage is higher than the first threshold voltage, the controller determines that both of the first charge relay and the second charge relay have stuck in a closed state.

4. The vehicle according to claim 2, wherein
    in the both-element diagnosis processing, when the first voltage is higher than the first threshold voltage and the second voltage is lower than the first threshold voltage, the controller determines that at least one of the first charge relay and the second charge relay has not stuck in a closed state.

5. The vehicle according to claim 2, wherein
    in the both-element diagnosis processing, when the first voltage is lower than the first threshold voltage, the controller performs again the first diagnosis processing.

6. The vehicle according to claim 1, wherein
    the second diagnosis processing includes one-element diagnosis processing for diagnosing whether one of the first charge relay and the second charge relay has stuck, and
    in the one-element diagnosis processing, the controller outputs a command to open the one of the first charge relay and the second charge relay and to close the other of the first charge relay and the second charge relay and determines whether the first charge relay and the second charge relay have stuck based on relation between the first voltage and a second threshold voltage and relation between the second voltage and the second threshold voltage.

7. A method of diagnosing sticking of a charge relay of a vehicle in which a power storage mounted on the vehicle is chargeable by receiving electric power supplied through a charge cable from a power feed facility outside the vehicle, the vehicle including a first power line, a second power line, a first relay electrically connected between a positive electrode of the power storage and the first power line, a second relay electrically connected between a negative electrode of the power storage and the second power line, a charge port to which a connector provided in the charge cable can be connected, a first charge relay electrically connected between the first power line and the charge port, a second charge relay electrically connected between the second power line and the charge port, a first voltage sensor that detects a voltage applied by the power feed facility to the charge port, a second voltage sensor that detects a voltage between the first power line and the second power line, and a communication apparatus that transmits a command to the power feed facility, the method comprising:

performing diagnosis processing for diagnosing whether the first charge relay and/or the second charge relay have/has stuck with the connector and the charge port being connected to each other, the performing diagnosis processing including performing first diagnosis processing with the first relay and the second relay being closed and performing second diagnosis processing with the first relay and the second relay being open, the performing first diagnosis processing including outputting a command to open both of the first charge relay and the second charge relay, transmitting a stop command requesting the power feed facility to stop output of electric power through the communication apparatus, diagnosing sticking of the first charge relay and the second charge relay based on the voltage detected by the first voltage sensor, and starting the second diagnosis processing when both of the first charge relay and the second charge relay are diagnosed as having stuck, the performing second diagnosis processing including outputting an open or close command to each of the first charge relay and the second charge relay, and determining whether the first charge relay and/or the second charge relay have/has stuck based on a first voltage detected by the first voltage sensor and a second voltage detected by the second voltage sensor.

* * * * *